Sept. 29, 1970  W. BEIG ET AL  3,530,951
DUAL CONTROL SYSTEM
Filed April 1, 1968  8 Sheets-Sheet 4

INVENTORS:
Willy Beig
Willi Kühnle
ATTORNEY:

INVENTORS:
Willy Beig
Willi Kühnle
ATTORNEY:

United States Patent Office  3,530,951
Patented Sept. 29, 1970

3,530,951
DUAL CONTROL SYSTEM
Willy Beig, Friedrichshafen-Waggershausen, and Willi Kuhnle, Friedrichshafen, Germany, assignors to Zahnradfabrik Friedrichshafen Aktiengesellschaft, Friedrichshafen, Germany, a corporation of Germany
Filed Apr. 1, 1968, Ser. No. 717,716
Claims priority, application Germany, Apr. 5, 1967, Z 12,784
Int. Cl. B60k 33/00
U.S. Cl. 180—77                                    13 Claims

ABSTRACT OF THE DISCLOSURE

The invention relates to dual control systems for vehicles wherein the fuel, brake, and steering elements normally under manual operation by a vehicle driver can be operated by a supervisory driver in the vehicle. A particular feature of the invention resides in a simplification of an infinitely variable system utilizing hydraulic power with electrical control circuitry wherein a single source of hydraulic oil pressure is utilized.

---

The invention relates to a previously filed U.S. application of the same inventors, Ser. No. 668,567, filed Sept. 18, 1967, having the same assignee as this application. In the prior filed application the invention relied on separate power or pressure sources for the several control elements of the vehicle and was particularly directed toward military vehicles such as tanks where the tank commander could take over control of the tank from the tank driver. The present modification relates particularly to both military and civilian vehicles wherein a tank commander or vehicle supervisor or driving instructor in the vehicle can take over control. The invention is susceptible, also, to radio control of vehicles, and is well suited to heavy vehicles and vehicles used in building construction and tracked vehicles.

Briefly, the invention comprises a dual control system wherein the fuel, brake, and steering elements are connected to the pistons of double ended hydraulic cylinders and wherein a pair of multiway valves control each such cylinder. The valves are solenoid operated under control of a selective switch arrangement conditioned by a control handle manipulated by the vehicle supervisor. The invention provides for disabling or immobilizing driver control of the fuel, steering and brake elements at the will of the supervisor, as well as motivation of such elements at his will and the locking of such elements in any desired actuated position with subsequent return to driver control at any time as desired by the supervisor. Further, the control handle is so arranged that it is moved forwardly in the direction of movement of the vehicle for acceleration and rearwardly for braking. The handle is also movable to the left or to the right for steering control. The system prevents operation of the fuel and brake pedals simultaneously but permits simultaneous steering and fuel or brake control. An important feature in the invention is the fact that by a simple change of the shape of a slot or aperture in a cover plate of the control mechanism housing, the supervisory control handle can be restricted in movement so that the brakes cannot be applied by supervisory control while the vehicle is executing a turn. This feature is advantageous where the invention is utilized in tracked vehicles in order to reduce transmission wear. In other vehicles no such restriction is necessary, and the vehicle can be braked or accelerated while making a turn.

A detailed description of the invention now follows in conjunction with the appended drawing in which.

Figure 1:
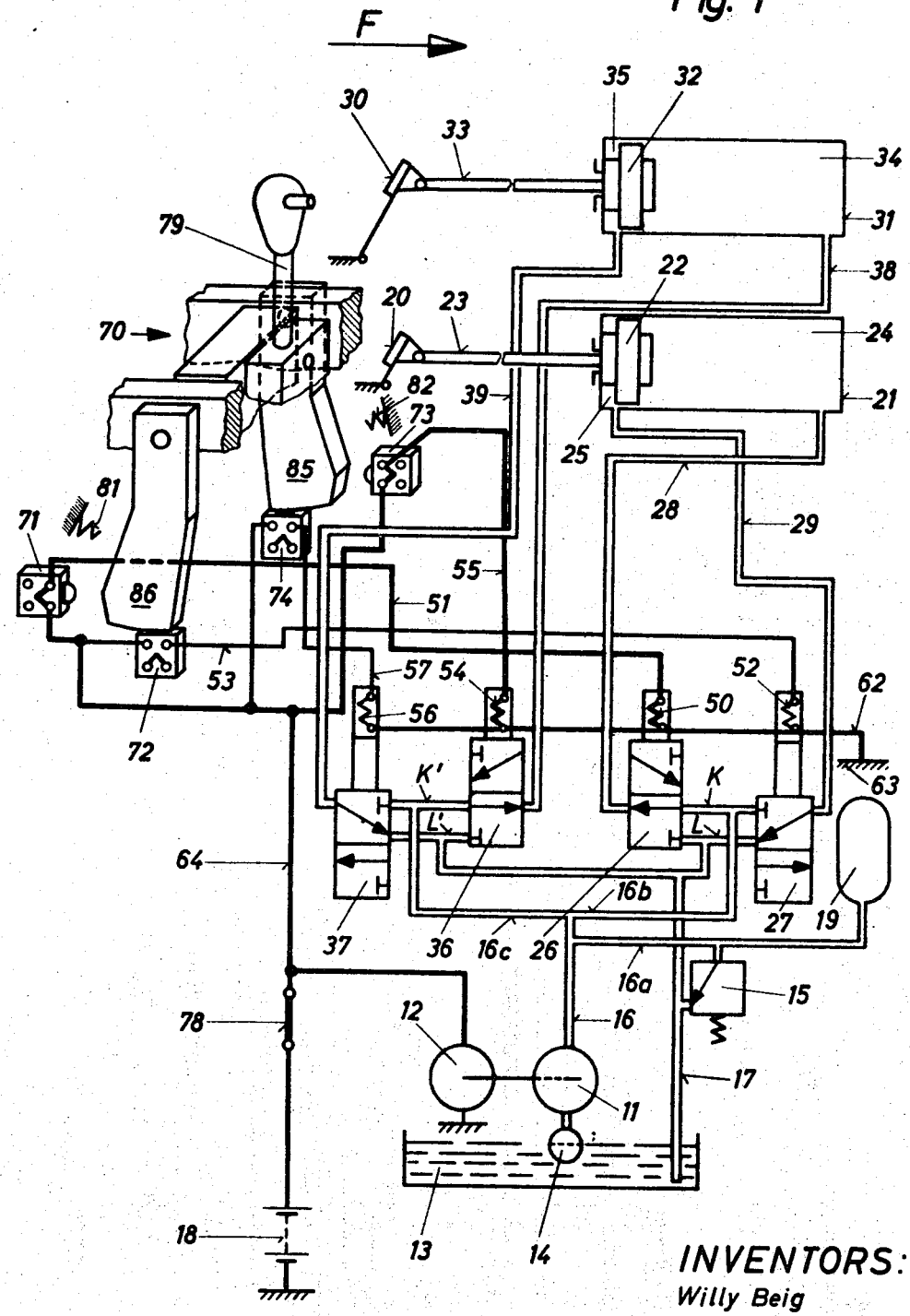
FIG. 1 is a schematic presentation of the electrical and hydraulic circuitry of the invention with a manual supervisory control device shown fragmentarily in perspective; certain valve solenoids are shown energized to effect cylinder pressure conditions which immobilize the fuel and brake elements against driver control.

Referring to FIG. 1, the symbolic representation of the invention comprises a pump 11 having an intake feed through filter 14 from reservoir 13 and driven by electric motor 12. Oil conduits are shown and comprise the pressure feed 16 from the pump outlet and the return conduit 17 leading to the tank. Conduit 16 feeds by a branch conduit 16a to a pressure accumulator 19 whereby a suitable supply of oil under pressure is maintained in a conventional manner, and a pressure regulator valve 15 will be seen as connecting from conduit 16a to conduit 17 whereby a constant feed pressure is maintained in the system in a conventional manner.

Pressure feed conduit 16 connects the branch conduits 16b and 16c which connect respectively to multiway valves 26 and 27, and 36 and 37. The multiway valves also connect by branch conduits, as will be noted, to the exhaust conduit 17. A respective conduit K and K¹ interconnects valves 26 and 27, and valves 36 as shown, to which conduit 16 connects while valve interconnecting conduits L and L¹ connect to conduit 17.

All of the valves are of a conventional construction of the type designated as 3/2-way valves and are solenoid operated, valves 26, 27, 36, 37 being operated respectively by solenoids 50, 52, 54 and 56.

The pair of valves 36 and 37 control the double-ended power cylinder 31 for brake control, conduit 38 connecting from valve 36 to the front chamber 34 and conduit 39 connecting from valve 37 to the rear chamber 35. This cylinder has a piston 32 connected by a link 33 to the brake pedal 30, which brake pedal can be manually actuated by the vehicle driver or by a vehicle supervisor in control of fluid pressure to cylinder 31.

In a similar manner, conduit 28 connects valve 26 to power cylinder 21, being connected to the front chamber 24, while conduit 29 connects valve 27 to the rear chamber 25 of that cylinder which has a piston 22 connected by link 23 to fuel pedal 20 normally under driver control. However, fuel control cylinder 21 can be used by a supervisor to take over fuel control by power actuation of pedal 20, over-riding driver control of that pedal.

The solenoid valves are actuated by energization under control of electrical circuitry which comprises a plurality of switches, all of which are normally closed, and operable to open position selectively by the supervisor.

Thus, switches 71, 72, 73 and 74, respectively, energize or de-energize solenoids 50, 52, 54 and 56. The electrical connections are shown in heavy lines, lead 51 from switch 71, lead 53 from switch 72, lead 55 from switch 73, all going to respective valves. However, certain switch interconnections are provided which connect to power lead 64, having a series supervisory switch 78 connected to battery 18 which in turn is connected to ground 63. A common ground connection 62 is provided for the solenoids as shown.

The interconnecting leads between switches are designated as A, B, and C, wherein any such lead may connect two or more switches in accordance with the wiring diagram as shown in FIG. 1 in order to provide solenoid valve control to effect the desired functions of the invention. It will be noted however, that the power lead 64 connects directly to all switches.

The switches are of a push-button type and operated via a supervisory control handle 79 mounted in a control mechanism 70 in a manner to be described and operable by the vehicle supervisor.

Thus, when handle 79 is rocked in the direction F shown in FIG. 1, a switch actuating lever 85 connected to handle 79 can open or close switches 73 and 74. Similarly, a lever 86 can actuate switches 71 and 72 when handle 79 is rocked in a direction opposite to F.

A spring 81 is fixed within the control mechanism 70 and spaced from lever 86 so that when handle 79 moves in direction F a predetermined distance it will engage the spring and thus it will be necessary for the operator to apply manual force for the purpose of moving lever 86 sufficiently to actuate switch 71. In a similar manner a spring 82 is disposed to be engaged by lever 85 after a predetermined opposite movement of the handle 79 which must be held in position by the supervisor to maintain switch 73 in an actuated condition.

Thus, the levers 85 and 86 are rocked in either direction following the movement of handle 79 to which they are coupled and which move in respective parallel planes for fuel and brake control, although handle 79 can also be rocked in a plane perpendicular to the direction F to effect steering control, as will be explained in conjunction with FIG. 7, save, at say, at this time, that handle 79 can rock around the axes of pins 93 and 94 (FIG. 7) for control of the switches shown in FIG. 1, and around the axis of pin 97 for steering control to actuate steering control switches 74, 75, and 76 to be later described.

Figure 7:
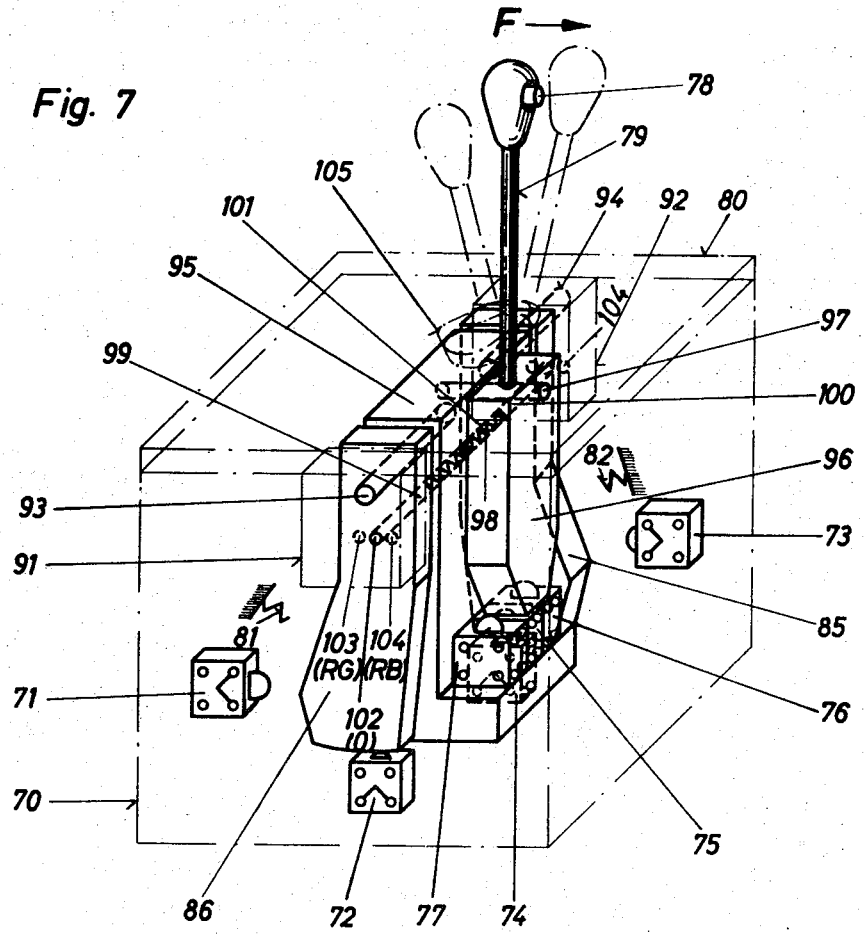
FIG. 7 is a skeletonized perspective showing the supervisory control mechanism.

It should be noted that the supervisory switch 78 of FIG. 1 is actually a push-button switch carried at the top of the handle 79, as illustrated in FIG. 7, and this switch when pressed by the operator sets up a supervisory control or command condition wherein the vehicle driver is no longer able to adjust fuel, brakes, or steering. Switch 78 also energizes pump motor 12 when pressed by the vehicle supervisor, as is apparent from FIG. 1.

Referring to FIG. 1, solenoid 52 is de-energized at switch 72, and solenoid 56 is de-energized at switch 74. On the other hand, solenoid 50 is energized at switch 71 and solenoid 54 is energized at switch 73. For this condition the handle 79 is in neutral position, being vertical, as shown in FIG. 1, and also as shown in FIG. 7, and reference may be had at this time to the motion diagram for handle 79, FIG. 8, wherein the filled central circle, designated as O, represents neutral position.

In the condition of the solenoids as described above, the valves are set to position, as can be readily traced out, so that feed pressure goes to the front cylinder chambers 24 and 34, while the rear chambers 25 and 35 are connected via the valves to exhaust conduit 17. Accordingly, the pistons 22 and 32 are pressurized to the left ends of their respective cylinders and maintained under pressure, thus over-riding the manual force of the driver on pedals 20 and 30, whereby he cannot manually operate fuel or braking of the vehicle.

All of this is accomplished by the normal neutral positioning of handle 79 and pressing of switch 78 to energize motor 12 and solenoids 50 and 54, although accumulator 19 would provide oil under pressure for a limited period of time.

Under ordinary driver control conditions, handle 79 would still be in vertical neutral position but switch 78 would be open. Accordingly, solenoids 50 and 54 would not be energized and the oil connections in the respective valves would be such that both chambers of each cylinder would be connected to exhaust, a matter of the inherent operation of the normal de-energized position of the valves, all of which are of identical conventional construction. Under such conditions, manual operation of the pedals would experience no serious impediment even though there is the requirement of moving of the pistons by manual force on the pedals, since the oil moved thereby is under atmospheric pressure at the tank 13 and pressure on the pistons is balanced atmospheric pressure, neglecting fluid friction in the conduits.

Figure 2:
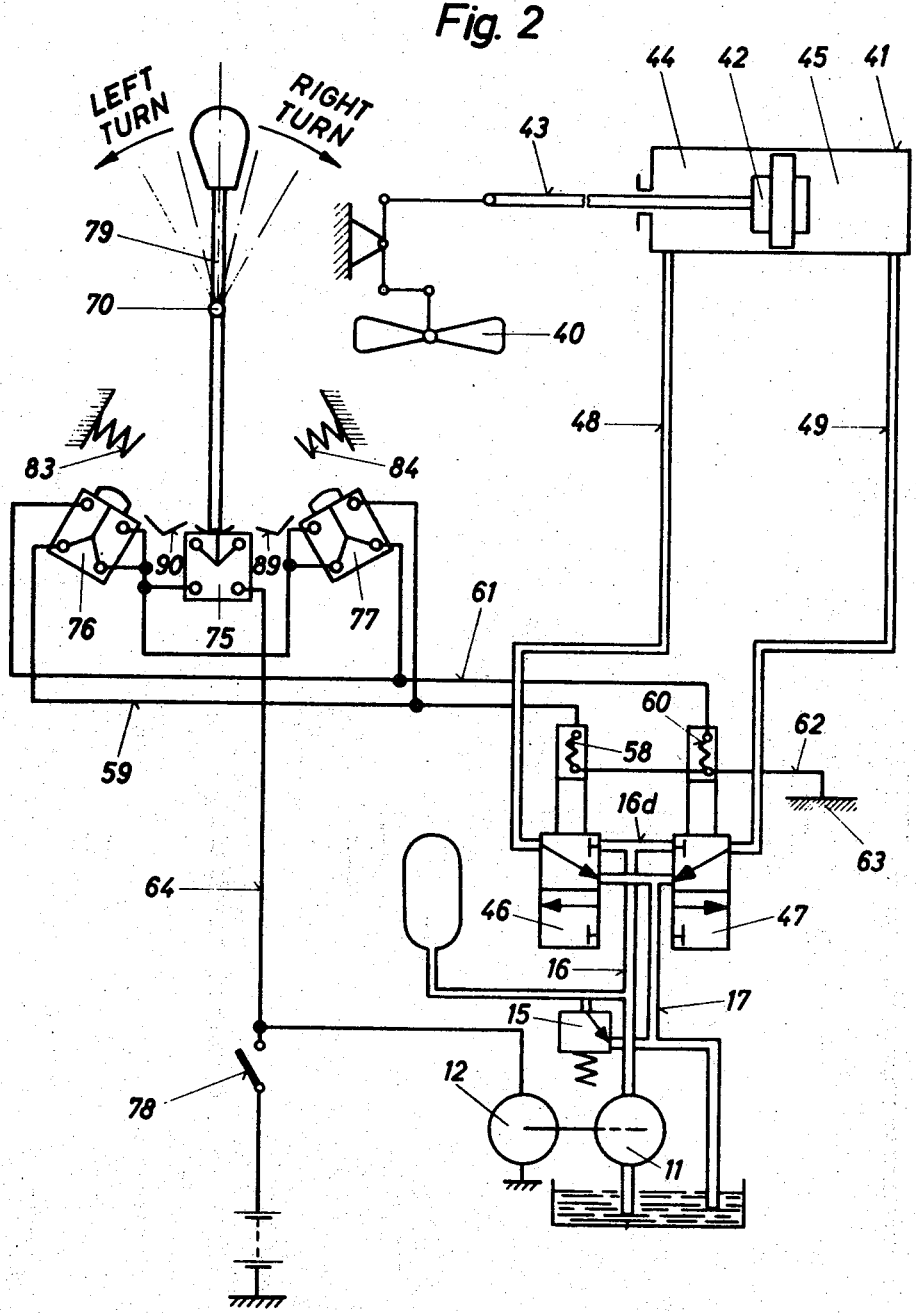
FIG. 2 is a schematic presentation for steering control showing a neutral position whereat steering can be effected by the vehicle driver.

Referring now to FIG. 2, wherein like reference numbers designate the same components heretofore described in connection with FIG. 1, and need not be again described, the schematic presentation for steering control illustrates a hydraulic power cylinder 41 which via piston 42 and linkage 43 actuates under supervisor control a steering wheel 40, which is otherwise actuated by the driver. However, with supervisior control, the left or right chamber 44 or 45 of cylinder 41 is pressurized to produce left or right steering by rocking of the steering wheel in the manner indicated for that component in FIG. 6.

As shown in FIG. 2, handle 79 is indicated as rockable in the plane of the paper, as previously described around the axis of pin 97 in FIG. 7, and actuates switches 75, 76, and 77 for the purpose of energizing or de-energizing solenoids 58 and 60 which control respective multiway valves 46 and 47 of the same kind described in connection with FIG. 1. The valves connect via conduits 48 and 49, respectively, to respective chambers 44 and 45 of the power steering cylinder 41.

Power is provided via the battery when switch 78 is closed, although in the condition shown in FIG. 2 it will be noted that the power lead 64 goes to switch 75 and at this time no connection is made to the power lead since the lower terminals of that switch are open by virtue of the neutral position of the lever 96 which is integrally rockable with handle 79. Under such conditions the valve solenoids are de-energized as can be readily traced through the circuitry of the switches and the leads 59 and 61. It is particularly important to note that regardless of whether switch 78 is open or closed, the same condition is maintained in that both ends of cylinder 41 are open to atmospheric pressure via the valves and that the driver can readily manipulate steering wheel 40, provided handle 79 is in the neutral steering position as shown in FIG. 2.

Also shown in FIG. 2 are symbolic detents 89 and 90 whereat lever 96 can be maintained in one rocked position or another, right or left, for a purpose which will subsequently be described.

Figure 3:
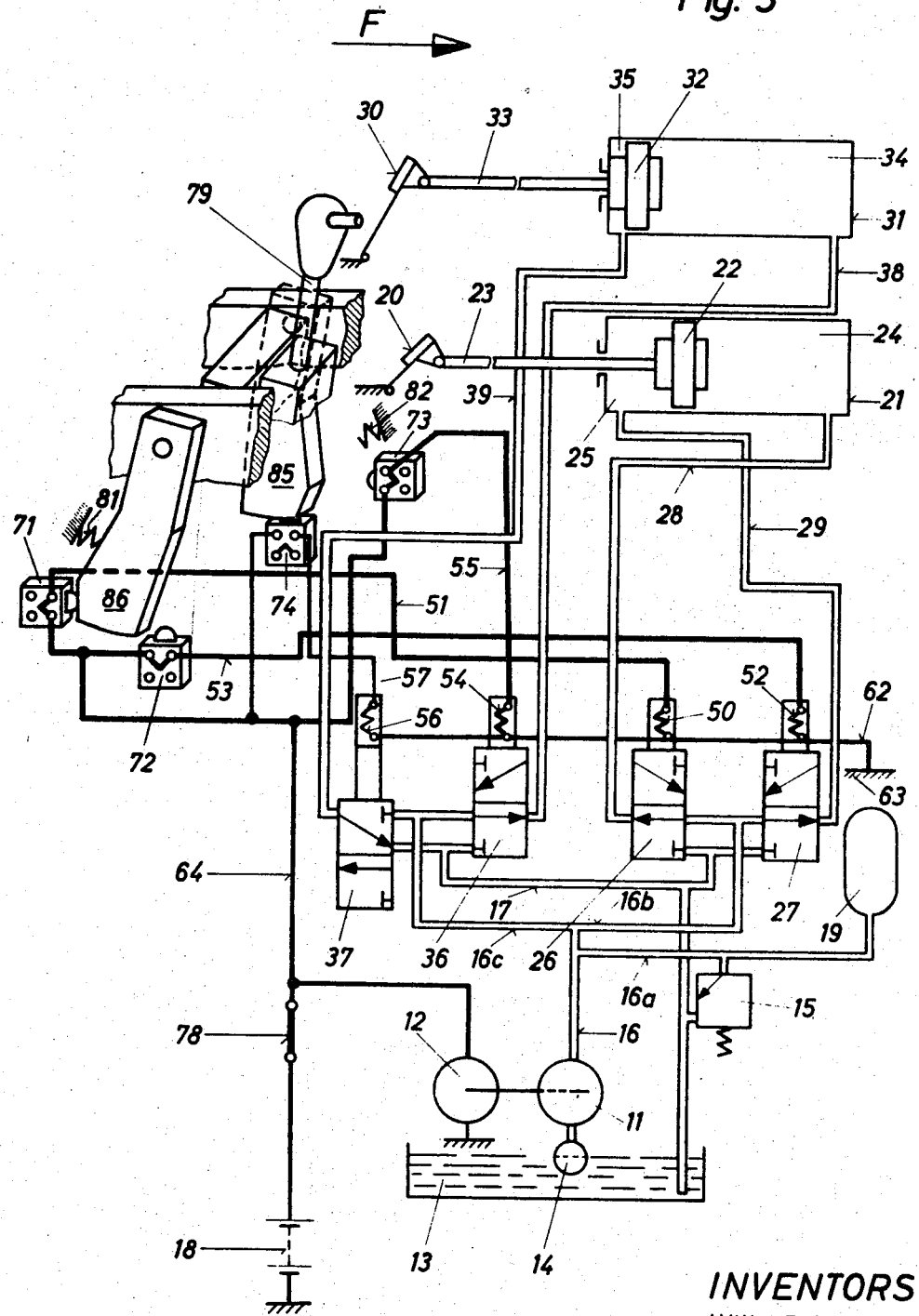
FIG. 3 is a view similar to FIG. 1, showing the condition of the components in readiness for the supervisor to control and adjust the fuel pedal.

Referring now to FIG. 3, a condition is illustrated wherein handle 79 has been rocked in a direction of the arrow F for the purpose of permitting the supervisor to lock the fuel pedal 20 in a particular position in order to maintain the vehicle at the speed at which it is going at that time.

It will be noted by comparison with FIG. 1 that switch 72 has now been permitted to close whereas there has been no effect as yet, insofar as actuation of switches 71, 73 or 74. This is due to the length of the lower switch engaging or camming edges of levers 85 and 86, as well as the position of the switches, all of which is, of course, a matter of suitably skilled design. Thus, even though lever 86 has approached switch 71 and come into engagement with spring 81, it has not actually caused any actuation of switch 71. This is a fuel pedal locking and rest position of handle 79 which is maintained in this position by means of a detent arrangement shown in FIG. 7 and comprising a spring pressed detent pin 99 slipping into a detent socket 103. Such position is represented by the filled circle RG on FIG. 8.

By tracing through the electrical and hydraulic circuitry of FIG. 3, it can be seen that chamber 34 of the brake cylinder 31 is being fed outlet pressure from the pump via valve 36, while chamber 35 is connected via valve 37 to the tank. Therefore, the brake is locked and the vehicle driver is powerless to operate the brake. However, it will be noted that outlet pump pressure is being fed to both ends of cylinder 21 and, therefore, a piston 22 is locked in whatever position it happens to be in within that cylinder at that time. This locks fuel pedal 20 against driver actuation for all practical purposes, despite the equalization of pressure on both sides of piston 22 since, obviously, the driver would have to push oil on the right-hand side of piston 22 back into the pump outlet to effect increased acceleration which he is unable to do. For the same reason, the spring return (not shown) of pedal 20 could not move pedal 20.

Figure 4:
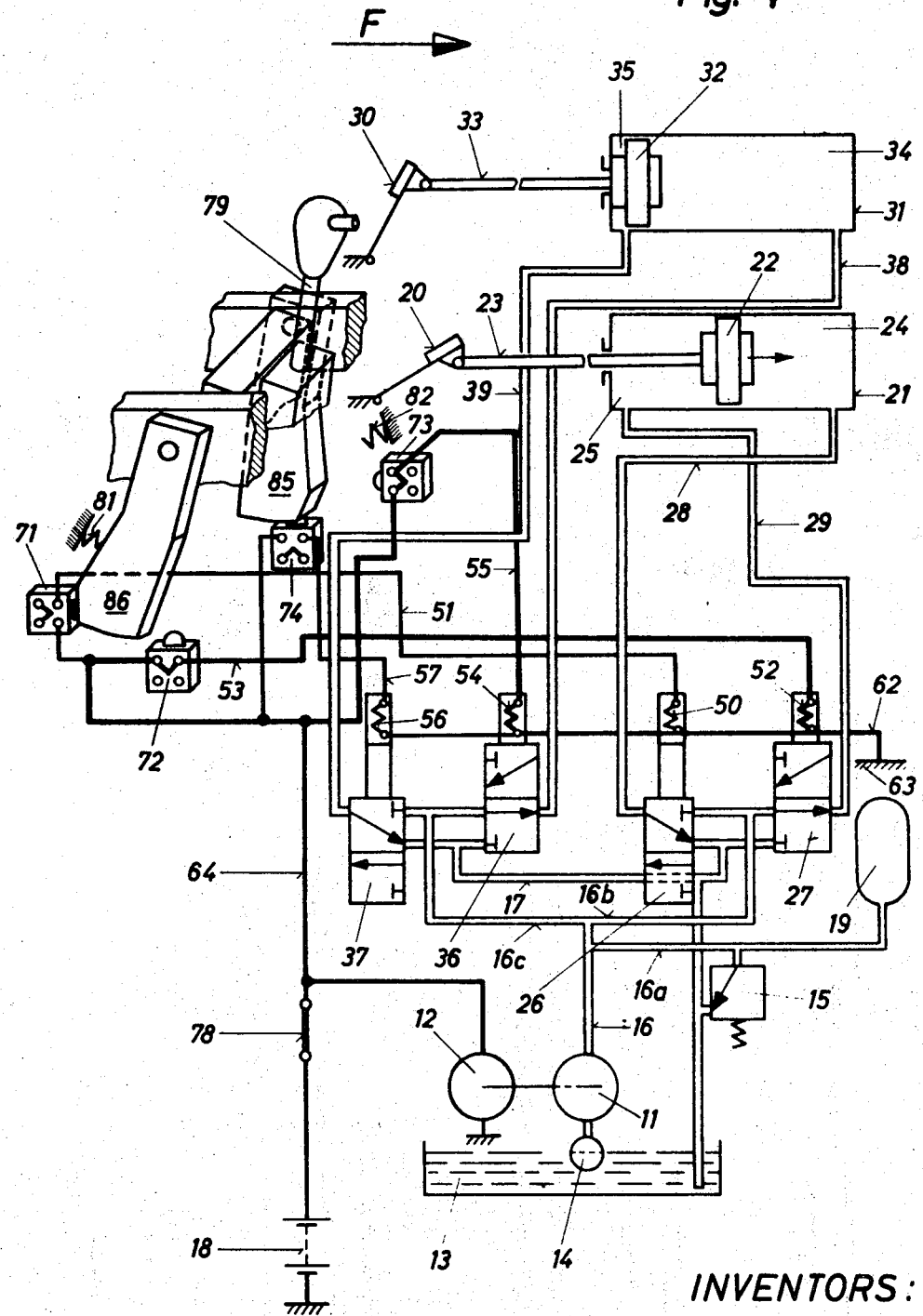
FIG. 4 is similar to FIG. 3, showing the components functioning to increase fuel feed.

Assuming now that the vehicle supervisor desires to control the speed of the vehicle he may do so by pushing handle 79 additionally clockwise, as viewed in FIG. 4, against the pressure of spring 81, thereby opening switch 71, although no actuation of switches 72, 73 or 74 takes place. However, in order to provide such additional vehicle acceleration he must hold handle 79 against the compression of spring 81, since if he relesaes the handle the spring 81 will cause it to return to the rest position of FIG. 3 thereby bringing about once more the locked condition of the brake and fuel pedals and maintaining the speed effected by the new position of piston 22.

By tracing through the electrical and hydraulic circuitry of FIG. 4, it will be seen that the solenoids 50 and 56 are de-energized. However, solendoids 52 and 54 are energized and actuation of prespective valves maintains cylinder 31 in brake locked condition, as in FIG. 3. Further, chamber 24 of the fuel control cylinder has now been connected to exhaust, permitting outlet pressure in chamber 25 to move piston 22 toward the right and thus increasing vehicle speed by depressing pedal 20.

Figure 5:
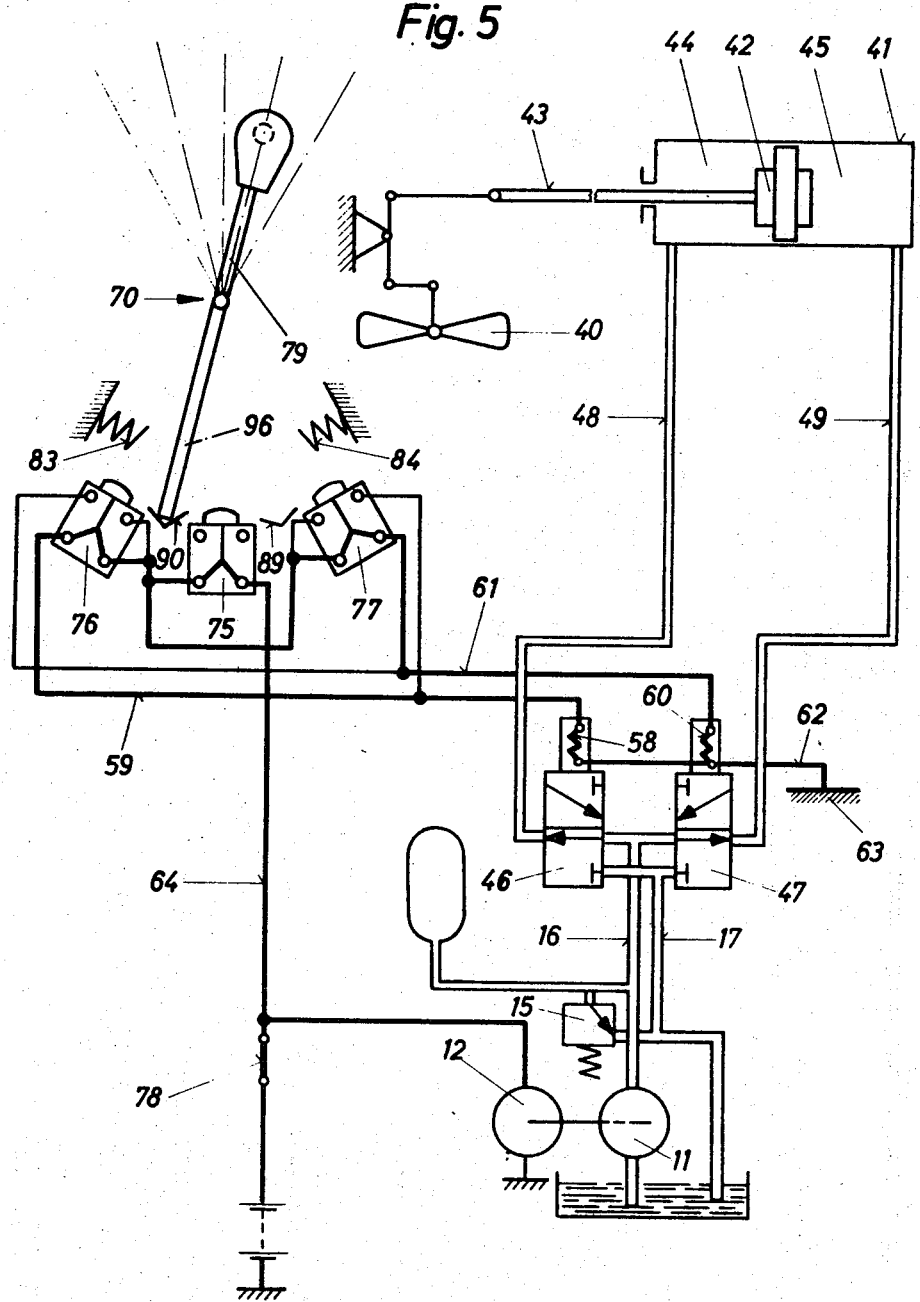
FIG. 5 is similar to FIG. 2, showing the components of the steering control system wherein the steering wheel is locked against driver control.

Referring now to FIG. 5, it will be noted that handle 79 has been swung clockwise and has come into a rest position effected by the detent 90. If the vehicle was executing a turn at this time, this handle position locks the turn radius previously set by the vehicle driver, assuming that the supervisor wishes to maintain that radius for a right-hand turn. In this instance it will be noted that the supervisor has presumably closed switch 78, thereby powering the power lead 64, and by virtue of the handle position, as compared with FIG. 2, switch 75 has now closed at its lower terminals, all switches 75, 76 and 77 being of a type that are normally closed at the lower terminals as shown. Accordingly, the electrical circuit conditions are set up so that solenoids 58 and 60 of respective valves of 46 and 47 are positioned to provide pump outlet pressure to both ends of cylinder 41, locking the radius of turn of the vehicle.

In a similar manner, swinging of handle 79 to detent 89 is used to lock a left-hand radius turn. However, it will be noted that insofar as the switches 75, 76, and 77 are concerned, there is actually no difference in condition, the handle being swung left or right for steering radius locking in order to position it for further movement in a respective direction should the supervisor desire to decrease the radius of turn in the particular direction by pressurizing one face or the other of piston 42.

Figure 6:
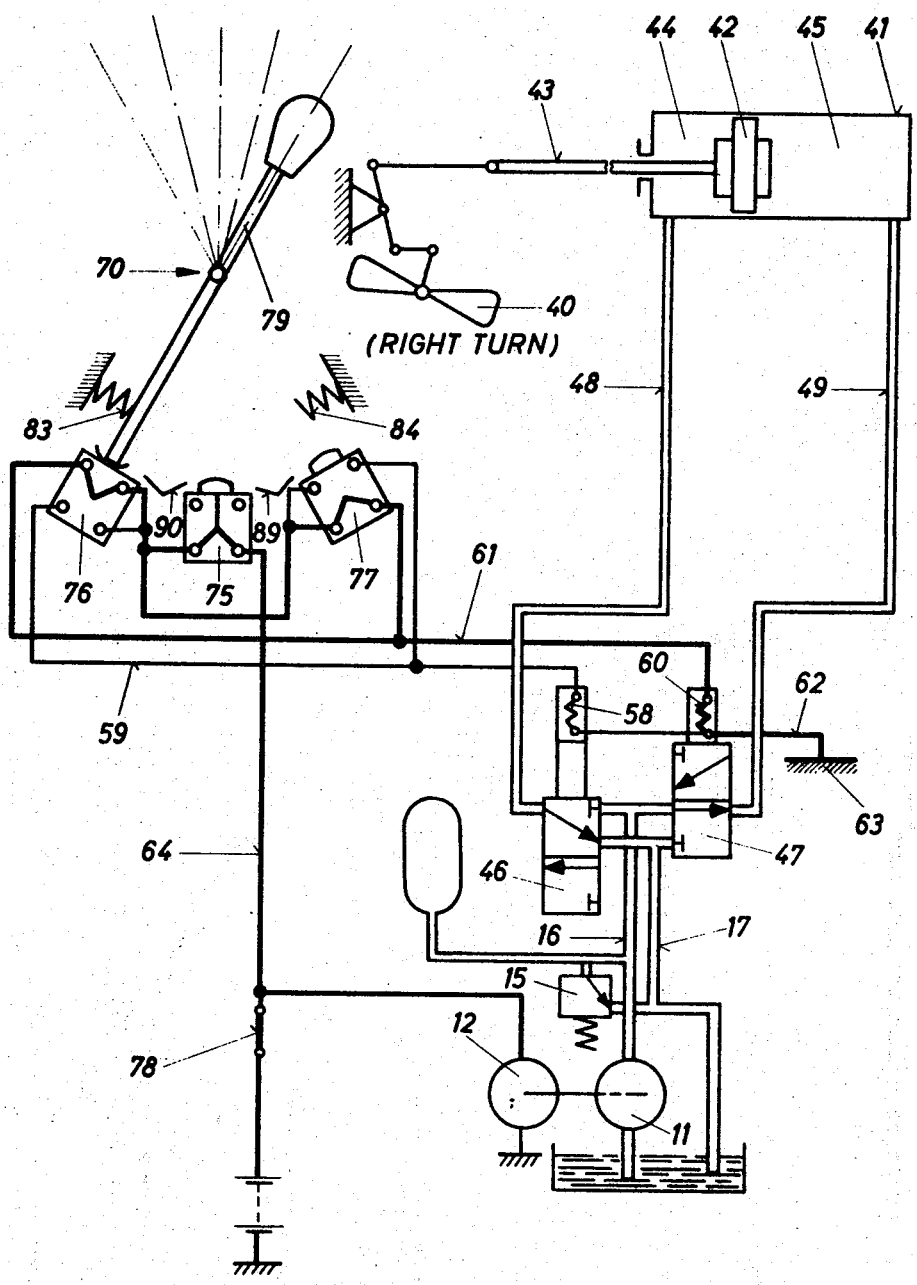
FIG. 6 is similar to FIG. 5 but progressing therefrom to show the components in the condition during which movement of the steering wheel is actually taking place for a right-hand turn.

Decrease of turn radius is explained in connection with FIG. 6, wherein it will be seen that handle 79 has been swung further clockwise, whereat lever 96 engages spring 83 which is fixed within the control mechanism, and the handle must be maintained against the compression of that spring by the manual force of the supervisor in order to hold switch 76 in the condition shown with connection across the upper terminals. So doing opens the circuit to solenoid 58 and energizes solenoid 60. Thus, chamber 44 is exhausted whereby pressure in chamber 45 moves piston 42 to the left and operates via the linkage 43 to swing steering wheel 40 for a decrease in turn radius to the right.

The same condition obtained for decreasing the radius of a left-hand turn wherein spring 84 is engaged by lever 96 and provides compression which must be overcome, and wherein switch 77 is actuated. Accordingly, solenoid 58 is energized and solenoid 60 de-energized, whence piston 42 is moved to the right by the differential pressure acting on it, as will be apparent.

It will be noted that push-button 78 is maintained pressed whenever it is desired to lock or change a steering radius when handle 79 is swung for steering control.

Figure 8:
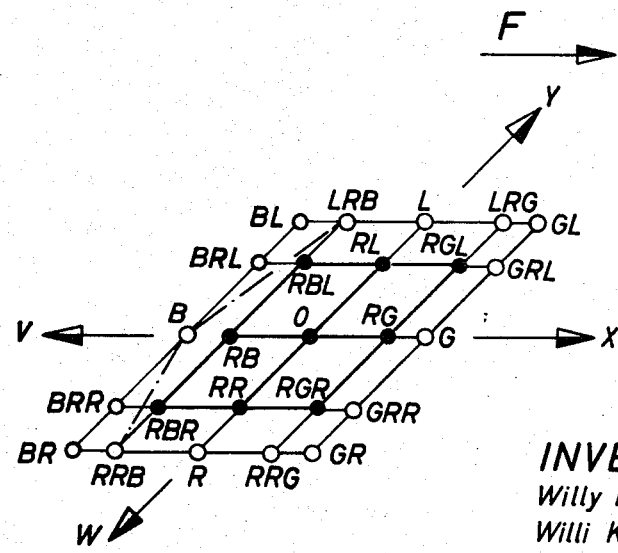
FIG. 8 is a diagrammatic layout showing the positions of the supervisory control handle for exercising various supervisory functions.

Referring momentarily to FIG. 8, the movements in the directions Y and W indicate respectively left and right turns, wherein the filled circles RL and RR symbolize the handle positions for a locked left turn and a locked right turn, while the open circles L and R symbolize the positions for reduced radius left and right turns, respectively.

Referring now to FIG. 7, the control mechanism 70 is illustrated shown within a phantom housing and comprises fixed bearing blocks 91 and 92, likewise shown in phantom, which support respective pins 93 and 94, extending from both sides of the blocks and into respective bores of levers 86 and 85 outwardly of the bearing blocks and inwardly thereof into a carrier member 95, likewise provided with bores for respective pins and disposed between the bearing blocks. Thus, the aforementioned pins and bores are all axially aligned and it will be apparent that the pins are keyed to the elements 86, 95, and 85 so that these three elements can swing integrally in the directions V or X of FIG. 8 in order to operate switches 71, 72 and 73, 74. The switches are fixed within the housing and are shown in conjunction with the fixed springs 81 and 82, as heretofore explained.

Swinging of the carrier member 95 and thus levers 85 and 86 is effected, of course, by handle 79, which is carried in lever 96 in turn pivotally carried on carrier member 95 by means of pin 97. Thus, lever 96 can actuate switches 75, 76, and 77, which are fastened to and carried by an extending flange at the bottom of carrier member 95, as shown in FIG. 7. The switches are, of course, arranged in an arc which is considerably exaggerated in FIGS. 2, 5 and 6, but which will be seen in FIG. 7 to be only of a degree necessary for actuating by the swinging lever 96 which is provided with suitable cam edges in a well understood manner.

For clarity, no wiring is shown in FIG. 7 nor are springs 83 and 84 nor are the detents 89 and 90 (FIG. 2) shown, but it will be obvious that such detents can be readily arranged between lever 96 and carrier member 95 of any conventional spring-pressed pin and socket type, as now to be described in connection with the swinging of handle 79 in the direction V or X (FIG. 8).

The support members 91 and 92 of carrier member 95 have three aligned bores on an axis 98, wherein a spring 101 is carried in the bore of carrier member 95 and presses outwardly in both directions against slidable detent pins 99 and 100 carried in that bore. The pins can engage in detent sockets 102, 103 and 104 provided in the inwardly facing surfaces of the support members 91 and 92. Thus, the sockets in the support members and the carrier member are all aligned on the same axis 98, depending upon the rocked position of handle 79 in a direction X or V (FIG. 8) so that the detent pins cam in and out of detent sockets 102, 103 and 104 for holding the handle in a selected position. In other words, when the handle is vertical the position is indicated on FIG. 8 as neutral position O, and the detent pins are then in sockets 102. However, when the handle is rocked in the direction X it can be maintained in fuel locked position (FIG. 3), indicated as RG in FIG. 8 by the detent socket 103. This represents a handle rest position. Further movement causes the handle to move to the position symbolized as G, an open circle on FIG. 8, where there is no detent, but pressure must be maintained by manual force of the operator against spring 81.

In a similar manner, moving the handle in a direction opposite to the arrow F in FIG. 8 to effect a braking function, coinciding with the arrow V of FIG. 8 from neutral position O, the brake locked position RB (FIGS. 3 and 4) is symbolized, and further movement in that direction is symbolized by the open circle B to show that the supervisor has taken over command function of the vehicle brakes. Such function is maintained against the force of the spring 82, as heretofore explained, the spring being engaged by the lever 85.

When handle 79 is held in brake or fuel control position G or B by the supervisor and then released, the spring 82 or 81 returns it to the next position, RG or RB, locking the fuel or gas pedal in the newly set position which is dependent on how long the handle 79 was kept in G or B position. Thereafter, the supervisor can relinquish control back to the vehicle driver by rocking handle 79 back to O or neutral position and releasing (opening) switch 78. The system provides a "dead man" safety since if the supervisor becomes incapacitated he releases switch 78, which opens, cutting off motor 12 and de-energizing all valve solenoids.

In a similar manner, handle 79 is held by detents 89 or 90 in RL or RR position, but movable against the force of springs 83 or 84 which can return it to radius locking positions RL or RR.

Figure 9:
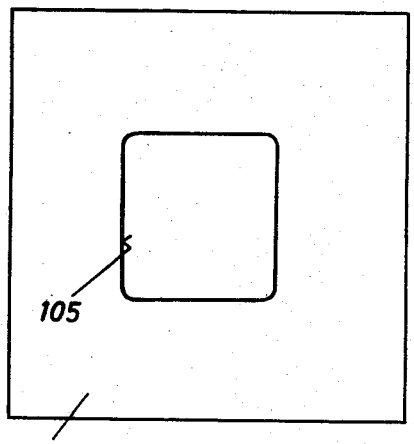
FIG. 9 illustrates in plan the cover plate of the control mechanism housing for ordinary vehicles.

From the preceding description it will be apparent that the control elements of the vehicle can be supervised, and by further reference to FIG. 8, noting additional positions symbolized thereon, it will be further apparent that simultaneous braking or accelerating while the vehicle is undergoing a turn is possible. Thus, if it is assumed that the slot in the cover plate 80 of the control mechanism housing is rectangular, as shown in FIG. 9, then the control handle 79 can be placed in each of the positions indicated in FIG. 8. Thus, from the neutral (O) position to RG (detent 103, rest positon) and thence to RGL. At this point the fuel is locked, the vehicle is making a left turn, and the steering is likewise locked at a fixed radius during that turn. This movement can be subsequently followed by movement to GRL at which the steering is locked but the fuel is adjustable, or to LRG at which the steering is adjustable but the fuel is locked. Subsequently, movement may be made to GL wherein both steering and fuel are adjustable. The preceding pertains to fuel and steering control for left-hand turns, and precisely the same arrangement pertains for right-hand turns at the position RGR, RRG, GRR and GR. In a similar manner simultaneous brake and steering control is effected at position RBL wherein both brake and steering are locked and LRB wherein steering is adjustable but the fuel is locked, this being for a left-hand turn. The same simultaneous control of handle position is indicated for right-hand turns at RBR and RRB.

In control mechanisms for ordinary vehicles, the control handle can be moved from RBL to BRL at which the brake is adjustable and steering is locked, or to BL at which both brake and steering are adjustable. In a similar manner, at BRR the brake is adjustable and the steering is locked, or the control handle may be moved to BR wherein both steering and brake are adjustable.

Figure 10:
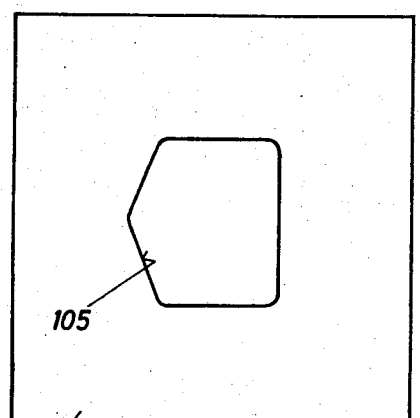
FIG. 10 illustrates in plan the cover plate for tracked vehicles.
Figure 11:
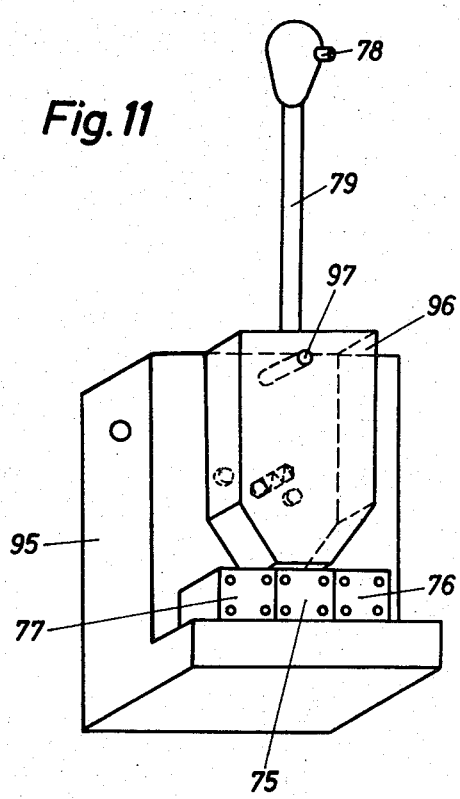
FIG. 11 is a fragmentary section illustrating a detent arrangement for holding the control handle in neutral and steering locked positions.

In the event that the invention is to be utilized for a tracked vehicle, then bracking should be restricted to straight ahead driving and accordingly, a slotted plate as shown in FIG. 10 is utilized, wherein movement of handle 79 is possible from a locking position RB to position B, or to RBL or RBR. Also, a movement may be made to LRB or to RRB. But the brake is locked, when the vehicle is making a left or a right turn, and the brake is likewise locked when the steering is adjustable.

In summation, handle 79 can move from neutral (O) to G (fuel control), to B (brake control), to L (left-hand turn), to R (right turn) with or without first pausing at a rest position, detent retained, at RG, RB, RL, RR, respectively. At any rest position the corresponding function is immobilized as to the vehicle driver if switch 78 is closed by pressing the button shown in FIG. 7.

Also, handle 79 can effect any combination of functions as depicted in FIG. 8, wherein any element is locked while another element is being actuated, or both elements are locked, or both being activated. The exceptions, of course, are that fuel and brakes are not subject to simultaneous control for adjustment but only for locking.

We claim:

1. A dual control system for fuel, brake and steering elements of the type normally subject to manual operation by a vehicle driver, said system being for overriding driver control of said elements, said system having a single source of fluid pressure and having a respective double ended pressure cylinder for each element with a piston for connection to said element for hydraulically locking said element against driver control and also for effecting actuation of each said element by a supervisor; said system having a pair of multiway valves for control of each cylinder and connection means to said single source whereby pressure feed and exhaust for each cylinder end is controlled by a respective valve; said system having a supervisory control mechanism for selective actuation of said valves by a supervisor comprising means to selectively pressurize and exhaust ends of said cylinders for effecting supervisory hydraulic locking and activating control of said elements.

2. A dual control system as set forth in claim 1, said supervisory control mechanism having circuitry comprising a plurality of electric switches and having selective control means for selectively actuating said switches, said circuitry having solenoids for respective valves and having connections for connecting said switches and solenoids with a power source for selective energization of said solenoids to selectively actuate said valves.

3. A dual control system as set forth in claim 2, wherein said single pressure source comprises a pump and an electric motor, and said circuitry comprises a supervisory-switch operative upon closing to energize predetermined solenoids through respective switches for controlling respective valves to pressurize one end of respective cylinders and exhaust the opposite ends thereof whereby the fuel and brake elements are immobilized against driver control.

4. A dual control system as set forth in claim 1, including conduit means interconnecting the respective valves for each cylinder whereby pressure flow from said single pressure source is conducted to each said valve to be directed to a respective cylinder end and exhaust flow is conducted through respective valves from said cylinder ends responsive to actuation of said valves so that each said valve can pressurize or exhaust a respective cylinder end.

5. A dual control system as set forth in claim 1, said supervisory control mechanism having locking means for effecting the pressurizing of both ends of one of said cylinders whereby the piston in said cylinder is immobilized against driver control at a desired adjustment of the element controlled thereby.

6. A dual control system as set forth in claim 1 wherein said supervisory control mechanism comprises a plurality of electrical switches selectively operable by a supervisor and also comprising circuitry having respective solenoids for a pair of said valves to control pressure to and exhaust from the ends of a respective cylinder having its piston connected to the steering element, said circuitry providing connections between said switches and said solenoids whereby in a neutral condition of said supervisory control mechanism as selected by a supervisor by control of said switches the ends of said cylinder are at atmospheric pressure so that a driver may effect steering control without being impeded by pressure in said cylinder.

7. A dual control system as set forth in claim 1, wherein said supervisory control mechanism comprises means for equally pressurizing both ends of each cylinder selectively to immobilize the respective piston against driver control.

8. A dual control system for fuel, brake and steering elements of the type normally subject to manual operation by a vehicle driver, said system being for overriding driver control of said elements, said system having a single source of fluid pressure and having a respective double ended pressure cylinder for each element with a piston for connection to said element for immobilizing said element against driver control and for effecting actuation of said element by a supervisor; said system having a pair of multiway valves for control of each cylinder wherein pressure feed and exhaust for each cylinder end is controlled by a respective valve; said system having a supervisory control mechanism for selective actuation of said valves by a supervisor to selectively pressurize and exhaust ends of said cylinders for effecting supervisory control of said elements; wherein said single pressure source comprises a pump and an electric motor, and said circuitry comprises a supervisory switch operative upon closing to energize predetermined solenoids through respective switches for controlling respective valves to pressurize one end of respective cylinders and exhaust the opposite ends thereof whereby the fuel and brake elements are immobilized against driver control; wherein said electric motor is in series with said supervisory switch so as to be energized or de-energized by respective closing or opening of said switch.

9. A dual control system for fuel, brake and steering elements of the type normally subject to manual operation by a vehicle driver, said system being for overriding driver control of said elements, said system having a single source of fluid pressure and having a respective double ended pressure cylinder for each element with a piston for connection to said element for immobilizing said element against driver control and for effecting ac- end is controlled by a respective valve; said system having a pair of multiway valves for control of each cylinder wherein pressure feed and exhaust for each cylinder end is controlled by a respectice valve; said system having a supervisory control mechanism for selective actuation of said valves by a supervisor to selectively pressurize and exhaust ends of said cylinders for effecting supervisory control of said elements wherein said supervisory control mechanism comprises a plurality of electrical switches selectively operable by a supervisor and also comprising circuitry having respective solenoids for a pair of said valves to control pressure to and exhaust from the ends of a respective cylinder having its piston connected to the steering element, said circuitry providing connections between said switches and said solenoids whereby in a neutral condition of said supervisory control mechanism as selected by a supervisor by control of said switches, the ends of said cylinder are at atmospheric pressure so that a driver may effect steering control without being impeded by pressure in said cylinder; wherein said supervisory control mechanism comprises a switch actuating handle rockable in a steering direction by a supervisor to a predetermined position whereat said switches effect solenoid control to pressurize both ends of said cylinder for immobilizing said steering element against driver control.

10. A dual control system for fuel, brake and steering elements of the type normally subject to manual operation by a vehicle driver, said system being for overriding driver control of said elements, said system having a single source of fluid pressure and having a respective double ended pressure cylinder for each element with a piston for connection to said element for immobilizing said element against driver control and for effecting actuation of said element by a supervisor; said system having a pair of multiway valves for control of each cylinder wherein pressure feed and exhaust for each cylinder end is controlled by a respective valve; said system having a supervisory control mechanism for selective actuation of said valves by a supervisor to selectively pressurize and exhaust ends of said cylinders for effecting supervisory control of said elements; wherein said supervisory control mechanism comprises means for equally pressurizing both ends of each cylinder selectively.

11. A dual control system for fuel, brake and steering elements of the type normally subject to manual operation by a vehicle driver, said system being for overriding driver control of said elements, said system having a single source of fluid pressure and having a respective double ended pressure cylinder for each element with a piston for connection to said element for immobilizing said element against driver control and for effecting actuation of said element by a supervisor; said system having a pair of multiway valves for control of each cylinder wherein pressure feed and exhaust for each cylinder end is controlled by a respective valve; said system having a supervisory control mechanism for selective actuation of said valves by a supervisor to selectively pressurize and exhaust ends of said cylinders for effecting supervisory control of said elements; said supervisory control mechanism comprising a supervisor controlled handle mounted and movable in a selected fore or aft direction of a vehicle from a neutral position to a rest position and subsequently movable in said selected direction to an element actuating position, detent means for retaining said handle in said neutral position or at either said rest position, switch actuator means movable with said handle and switches positioned to be operated by said switch actuator means, including circuitry means having solenoids for actuating a pair of said valves for immobilizing the piston of a selected cylinder by fluid pressure on both sides thereof when said handle is in a rest position, the selection of said cylinder being dependent upon the direction of movement of said handle.

12. A dual control system as set forth in claim 11, including spring means engageable by said switch actuator means during the course of said subsequent movement to an element actuating position for returning said switch actuator means to rest position.

13. A dual control system for fuel, brake and steering elements of the type normally subject to manual operation by a vehicle driver, said system being for overriding driver control of said elements, said system having a single source of fluid pressure and having a respective double ended pressure cylinder for each element with a piston for connection to said element for immobilizing said element against driver control and for effecting actuation of said element by a supervisor; said system having a pair of multi-way valves for control of each cylinder wherein pressure feed and exhaust for each cylinder end is controlled by a respective valve; said system having a supervisory control mechanism for selective actuation of said valves by a supervisor to selectively pressurize and exhaust ends of said cylinders for effecting supervisory control of said elements; said supervisory control mechanism comprising a supervisor controlled handle rockable in a direction fore and aft of said vehicle and in a direction left and right of said vehicle, and means for mounting said handle comprising a pivotal carrier rockable in said fore and aft direction, and means for mounting said handle on said carrier whereby said handle is rockable in a left and right direction, detent means for retaining said handle in a neutral position and in rocked fore, aft, or left and right rest positions, said supervisory control mechanism having means responsive to the handle being in a rest position to immobilize the pistons of a respective cylinder against driver operation, responsive to selection of rest positions by a supervisor, said handle being subsequently movable beyond any such rest position and means to effect the pressurizing of ends of respective cylinders responsive to said subsequent movement.

References Cited

UNITED STATES PATENTS

| | | | |
|---|---|---|---|
| 1,748,041 | 2/1930 | Backus | 180—77 |
| 2,391,881 | 1/1946 | Clay | 180—77 X |
| 2,638,232 | 5/1953 | Perkins | 180—77 X |

BENJAMIN HERSH, Primary Examiner

J. A. PEKAR, Assistant Examiner